United States Patent [19]

O'Hare

[11] Patent Number: 4,646,523

[45] Date of Patent: * Mar. 3, 1987

[54] WIRE ENGINE FOR WATER PUMPS

[76] Inventor: Louis O'Hare, 1700 Banyan #3, Fort Collins, Colo. 80526

[*] Notice: The portion of the term of this patent subsequent to Nov. 12, 2002 has been disclaimed.

[21] Appl. No.: 758,827

[22] Filed: Jul. 28, 1985

Related U.S. Application Data

[63] Continuation-in-part of Ser. No. 404,449, Aug. 2, 1982, Pat. No. 4,551,978.

[51] Int. Cl.[4] .............................................. F03G 7/02
[52] U.S. Cl. .................................. 60/641.13; 60/527; 60/641.11
[58] Field of Search ....................... 60/527, 529, 641.8, 60/641.11, 641.13

[56] References Cited

U.S. PATENT DOCUMENTS 4,041,706  8/1977  White ................................. 60/527
4,551,978 11/1985  O'Hare ............................ 60/529 X Primary Examiner—Stephen F. Husar

[57] ABSTRACT

Mechanical energy is provided in the form of continuous reciprocating motion by causing repeated temperature alternations in wire arrays made of alloys of shape memory metals when alternating changes in the lengths of the wires result from repeatedly heating and then cooling the wires as these arrays are contacted by alternate flows of first heated and then cooled fluid such as air, with the alternate fluid flows being provided by a draft which draws first heated and then cooled air over the wires to produce contractions and then elongations along the length of the wires. In the principal embodiment the required draft is provided by a solar heated convection column which by means of valving draws air first from a solar collector and then from a cooling duct.

12 Claims, 11 Drawing Figures

WIRE ENGINE FOR WATER PUMPS

THE SPECIFICATION

This invention is a continuation in part of the invention of my copending application Ser. No. 404,449 of filing date 08/02/82 called, "Bimetallic Solar Engine", now U.S. Pat. No. 4,551,978. This present invention uses temperature changes imposed on special metallic elements to produce shape changes in metals just as the copending invention does, but in the present invention the shape changes are elongations and contractions along the length dimension of the wires whereas in my previous invention the shape changes are the changes in the shapes of springs. Both of the inventions provide direct continuous reciprocating motion by repeated temperature alternations induced in temperature responsive materials. Both the present invention and the cited invention differ from the prior art in that the heating period is made to occur simultaneously in all of the heat sensitive elements to provide a periodic net motion in one direction during that period and in that the cooling period takes place at an alternate time and is made to occur simultaneously in all of the heat sensitive elements to produce a net motion in the opposite direction.

In some respects the present invention is similar to all thermodynamic engines which convert heat energy into mechanical energy because heat flows through the engine from a high temperature heat source to a heat sink at a cooler temperature while the heat energy is being converted to physical motion. In this present engine heat from an external source of heat energy such as a solar collector is brought into the engine by a heat transfer fluid moving from the heat source to the heat sensitive wire arrays. The flow of heated fluid takes place in discrete periods of time and accomplishes the heating of the arrays with the consequent alteration of the length of the array in one increment of time. Then in the next increment, after the wires have been heated and undergone change in length, the removal of heat is accomplished in a second time frame in which cooled fluid such as air moves into contact with the wire arrray. The fluid flowing during this second period is cooled by an upstream heat sink located in a cool place. The periodic alternating between the two separate functions of heating and then cooling is accomplished by valving and valve linkage mechanically connected to the wires changing shape. Actuating cogs connected to the heat sensitive arrays contact the valve condition changing linkage during the final part of the shape change in either direction. In this way the change in shape in the wires that takes place by heating is the very cause of the movement that moves the valve to flow cooling air onto the same wires, but it is only the final small fraction of the total movement in one direction that effects the change. Cooling flow over the wires can thereby begin only when the effects of heating are in their final stages. Similarly, the length change due to element cooling produces the movements that reconditions the valve to flow heating air but it is only the final increment of that motion which effects the valve condition change to admit hot rather than cool air to the wires.

Accordingly, the present invention is similar to my cited copending application in that all shape changing elements are heated together at one time and then cooled together at another time and so on and in this way both inventions are different from the prior art cited in reference to application Ser. No. 404,449, now U.S. Pat. No. 4,551,978. However, this present invention has a distinct advantage over the invention of that previous application in that the use of wires greatly simplifies the fabrication complexity required to provide the heat sensitive materials and this engine is able to operate more rapidly because of the shorter time required to heat and cool wires rather than springs. Wires are merely placed in tension along their lengths to form a parallel array of wires through which air is easily circulated both for heating as well as for cooling. Heat transfer is thereby enhanced since the use of wires provides a maximum surface area for a minimum quantity of heat responsive material. In this aspect the present invention resembles the wire engines sold by Innovative Technology International Inc. of Beltsville, MD. However, the engines sold by that company are rotary engines in which closed loops of wire rotate on pulleys. One segment of the loop is being heated at the same time another segment is being cooled. All heating and all cooling does not take place alternately as it does in the present invention and those engines are not designed for the purpose of producing the most simple type of reciprocating motion.

The objective of the present invention is to provide an extremely simple means for utilizing solar energy to drive a water pump. Since simple reciprocating pumps have long been proven useful in association with wind mills, equal benefit is to be had from an engine capable of driving simple piston water pumps with sunlight and the purpose of the invention is to provide reciprocating energy for such a pump from solar heat in as simple and inexpensive a manner as possible. The ways in which the objective is achieved according to the various embodiments of the invention can be seen now by referring to the drawings.

DESCRIPTION OF THE PREFERRED EMBODIMENTS

Figure 1:
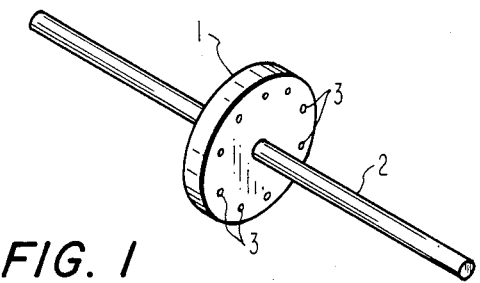
FIG. 1 of the drawings shows a sturdy drum fixed to a metal drive rod shaft.

Referring then to FIG. 1 of the drawings, cylindrical drum 1 is rigidly fixed to shaft 2. The drum 1 contains wire insertion holes 3 which are capable of receiving the shape memory metal wires shown later in FIG. 4.

Figure 2:
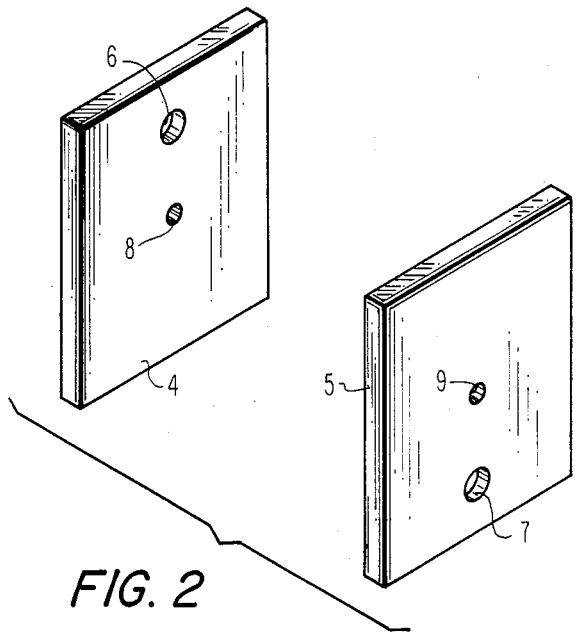
FIG. 2 shows support blocks with horizontal holes capable of supporting a shaft as well as other holes for the passage of air.

Next in FIG. 2, the support blocks 4 and 5 have air passage holes 6 and 7 and bearing holes 8 and 9. The rod 2 of FIG. 1 is capable of fitting into 8 and 9 of this FIG. 2 and of thereby sliding horizontally back and forth in 8 and 9.

Figure 3:
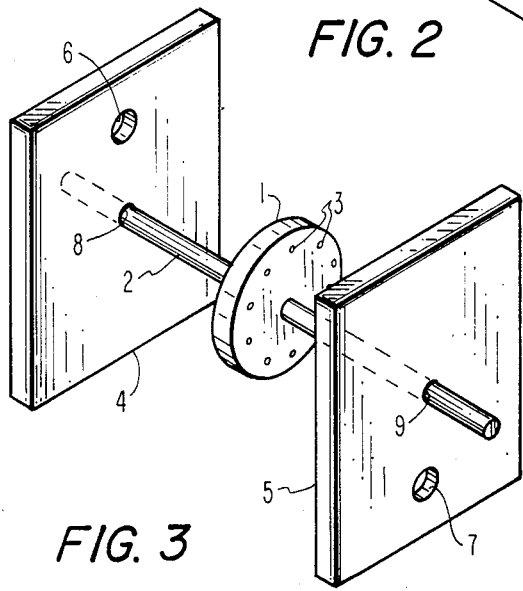
FIG. 3 shows support blocks holding a horizontal drive rod which is fixed to a drum.

In FIG. 3 the assembly of the elements of FIGS. 1 and 2 is shown with rod 2 mounted in holes 8 and 9 and drum 1 attached to 2. The support blocks 4 and 5 hold 2 and are the sides on either end of rectangular box shown in FIG. 6 by box 20 and formed by box side boards 10,11,12 and 13 shown in FIG. 5. In this FIG. 3 the air passage holes 6 and 7 provide for the passage of first hot and then cool air through the box 14 shown in FIG. 6. In FIG. 3 holes 3 receive wires 16 and 17 of FIG. 4.

Figure 4:
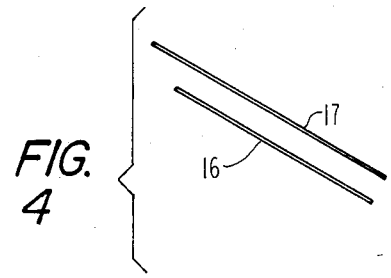
FIG. 4 shows two lengths of wire of different size representing a length change capable of taking place in a wire of shape memory metal.

In FIG. 4, the wires 16 and 17 show two conditions of a shape memory metal alloy wire and are drawn for the purpose of describing the effect of a temperature change on the length of such a wire. Multiple wires represented by the single wire shown as 16, but not shown here in the multiple form, each have one end attached to a hole 3 in drum 1 of FIG. 3. The opposite end of 16 is attached to block 5 of FIG. 3.

Figure 5:
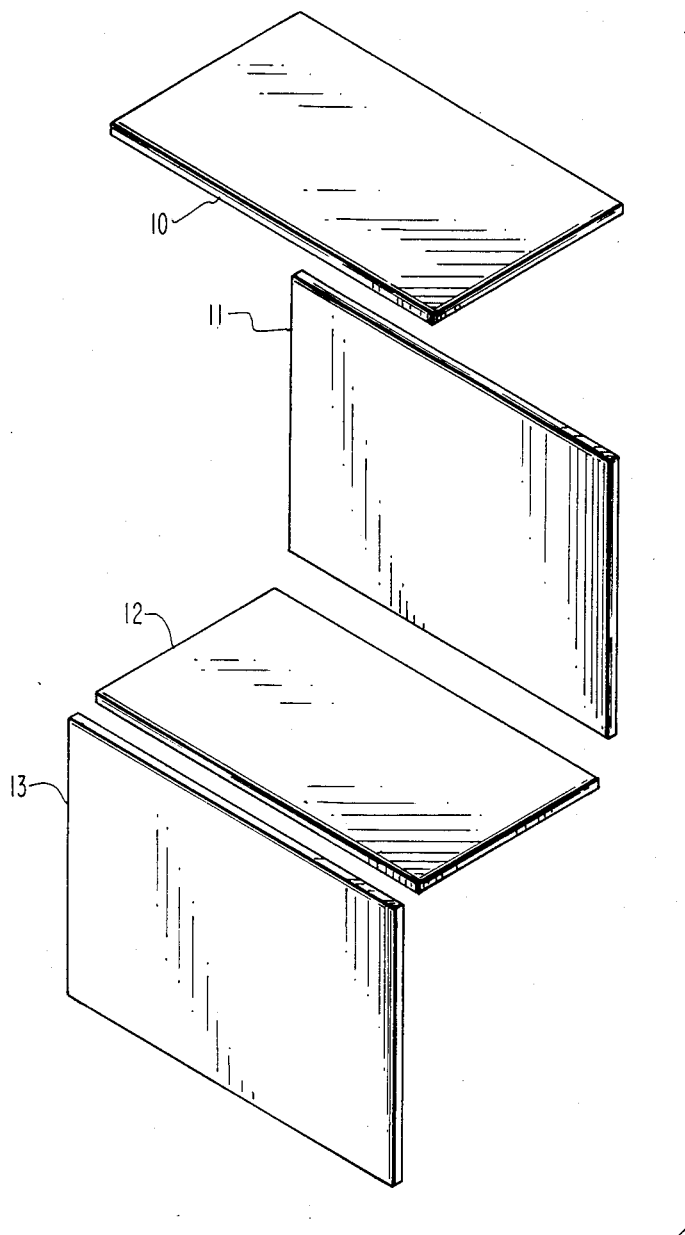
FIG. 5 shows four sides of a box capable of forming an enclosure around the support blocks, shaft and drum of FIG. 3.
Figure 6:
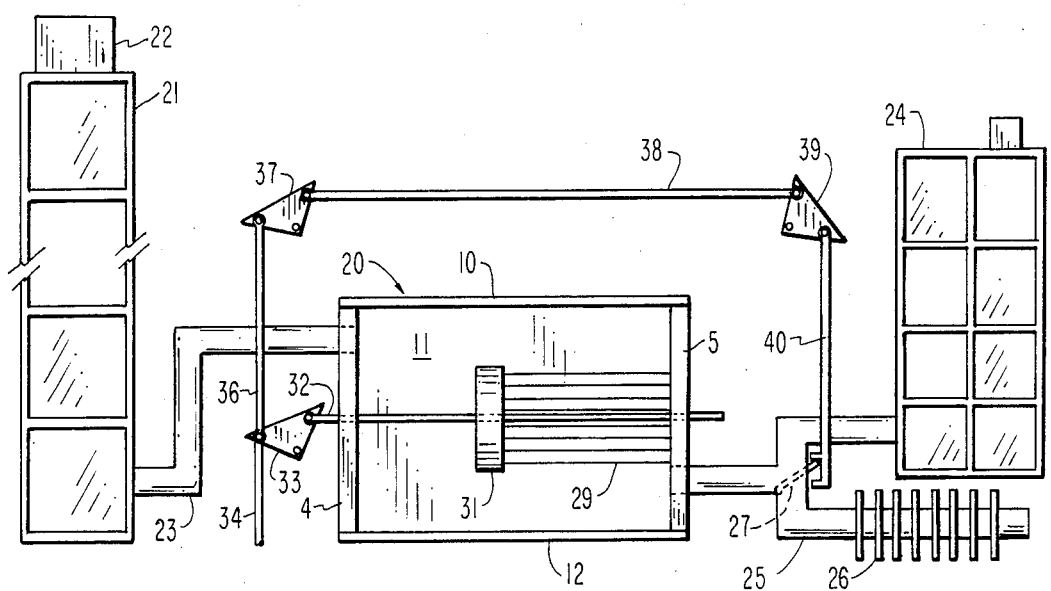
FIG. 6 shows a solar heated convection column, a housed and supported horizontal shaft with drum and wires, a solar collector and heat sink.

In FIG. 5 the side boards 10,11,12 and 13 form the sides along the length of a rectangular box shown as box 20 in FIG. 6. The end sides of this box are shown in FIG. 2 by support blocks 4 and 5. The function of the sides is to form an insulated box 20 for enclosing heat responsive wire like wire 16 of FIG. 4 in order that the wires may be rapidly heated and cooled by alternate flows of heated and cooled air through the box.

In FIG. 6 the assembled box 20 is shown with the support blocks 4 and 5 as the end sides and with its sides 10,11 and 12. The side 13 is omitted in this drawing only for the purpose of illustrating a view of the internal elements but it is to be understood that the side 13, shown in FIG. 5, is to be used in association with 20 to make 20 a box enclosed on all sides. Solar heated convection column 21 heats a column of hot air within and as the heated air rises through the opening 22 at its top it produces a draft at its base thereby drawing in air through duct 23 from 20 and from collector 24 through valve 25. Valve 25 is able to provide fluid flow communication either among 21,20 and 24 or among 21,20 and cooler 26 depending upon the condition of valve lever 27. In the position shown air heated by solar collector 24 has been drawn by 21 into 20 in which shape memory metal wires 29 have been heated and contracted by the hot air thereby sliding drive rod 32 to the right. The movement of 32 to the right rotates bell crank 33 clockwise lifting pump rod 34 which is connected to a pump in a well not shown. The clockwise rotation of 33 lifts uplink linkage 36 to rotate second bell crank 37 clockwise and horizontal arm 38 is moved to the right to rotate bell crank 39 to the right thereby moving cog arm 40 downwards and into contact with 27 to change the condition of 25 thereby removing air flow from 24 and enabling flow from 26. The cooled air that is then drawn from 26 into 20 by the draft at the base of 21 causes the cooling of wires 29 and their elongation. It is then that the weight of pump rod 34 rotates 33 counter-clockwise pulling rod 32 with attached drum 31 to the left. The consequent counterclockwise rotation of bellcranks 33,37 and 39 lift 40 which rises until wires 29 are near the limits of their elongating movement. Then in the last increments of upward motion 40 contacts 27 to again change the condition of valve 25. Air flow is then removed from 26 and enabled from 24 to begin again the heating of 29. The wires 29 correspond to the wires described in FIG. 4 and are of shape memory alloys which are capable of the length differences shown by 16 and 17 in that drawing. It should be noted that FIG. 6 is described for the use of memory metal wires which contract in length when heated such as nitinol, but it is not intended to limit the basic inventive concept to the use of wires of shape memory metal alloys which contact in length when heated but other alloys may be used which elongate when heated. In an alternate embodiment the positions of 24 and 26 are interchanged so that 26 is connected to the top of valve 25 and 24 to the bottom of 25 and shape memory alloys are used in the wires which elongate when heated and contract when cooled. It is further not intended to limit the basic inventive concept to the use of wires alone as the elongating and contracting elements 29 but in an alternate embodiment flat metal foil is to be used for elements 29. In this embodiment just as in each embodiment the elements which expand and contract in their length dimension must be fixed to a moveable member at one end and a fixed member at the other end. In this FIG. 6 the moveable member to which adjacent ends of all parallel heat sensitive elements are attached is to shaft 32 by means of the drum 31 bonded to that shaft. The fixed member at the opposite end of all parallel heat responsive elements 29 is support block 5.

Figure 7:
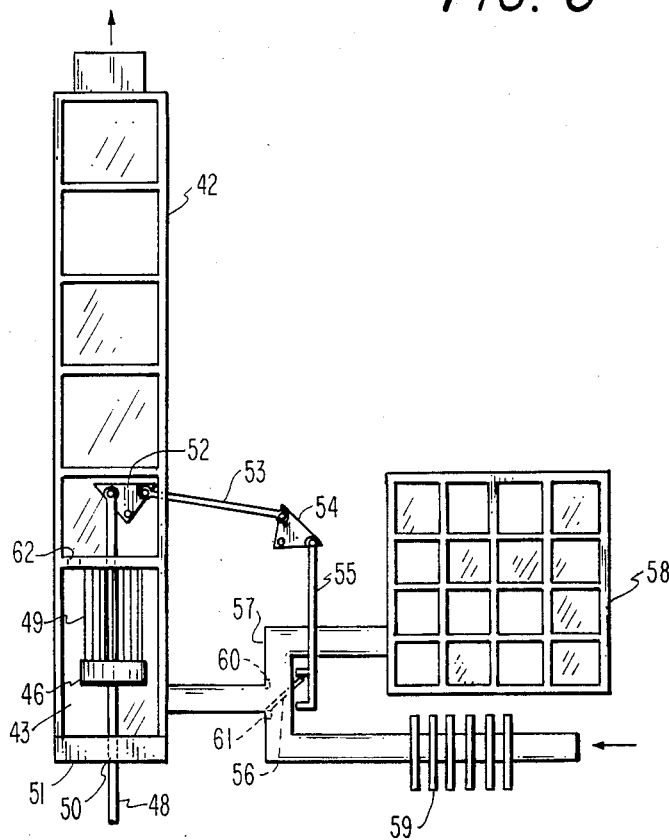
FIG. 7 shows a vertical solar heated convection column with a vertical wire drum in its base and a solar collector and heat sink.

Referring then to FIG. 7, the solar heated convection column 42 has the same function as column 21 of FIG. 6 in that it heats a column of air within causing it to tend to rise and provide a low pressure area at its base. The low pressure then draws air through lower compartment 43 which functions in the same way in this FIG. 7 as box 20 functions in FIG. 6. This compartment 43 is shown in an open condition but it is to be understood that it is covered by a cover not shown and is in fact an enclosed compartment. Heat responsive wires 49 correspond to 29 of FIG. 6. and support block 45 in this FIG. 7 corresponds to support block 5 of FIG. 6. When drum 46, attached to rod 48, is moved upwards by contracting wires 49 then drive rod 48 to which it is attached slides upwards through hole 50 in base block 51. The top of rod 48 rotates bell crank 52 in a clockwise direction moving top linkage arm 53 to the right and rotates lower bell crank 54 clockwise moving cog linkage 55 downwards thereby causing valve lever 56 to change the condition of valve 57 preventing air flow from the solar collector 58 and providing flow from finned cooler 59. The cog linkage 55 functions in the same way cog arm 40 does in FIG. 6 to effect an air flow change with a consequent temperature change in 43 only at the point of maximum travel as is caused by either an elongation or a contraction of the heat responsive elements. In this way it is only near the end of the throw of rod 48 in either direction that the valve condition changes to move the rod 48 in the opposite direction. Magnetic latches 60 and 61 hold the valve lever 56 in the condition in which it is placed by 55. Immediately after the valve 57 is changed to provide series fluid flow communication between 59,43 and 42, the draft at the base of 42 draws cool air from 59 from 57 and across heat sensitive wires 49. The cool air flowing over 49 then causes an elongation of 49 and the elongation moves drum 46 and shaft 48 to move downward in direction. Shaft 48 is attached to a water pump shaft not shown and the weight of the shaft assists in moving 48 downward. As cool air continues to flow through 43 to 42 through opening 62, wires 49 continue to elongate until the lower cog of 55 contacts and rotates 56 counterclockwise thereby causing a heating cycle to begin again. In an alternate embodiment the action of bell crank 52 is reversed so that the fixed fulcrum of 52 is above the pivots of 48 and 53. In this alternate embodiment an alternative type of shape memory metal wires are employed which elongate when heated. Shaft 48 is then lifted when air flow is established between 43 and 59 and the upward movement of 48 causes the upward movement of cog link 55 in place of the downward movement of 55 which the upward movement of 48 produces in the principal embodiment. In this way it is possible to adapt the invention to the use of different types of shape memory metal wires and thereby to provide different embodiments of the same inventive concept. The various embodiments are adjusted for maximum performance by adjusting the length of cog linkage 55 to best match the size and the length changes of the wire array 49. The magnetic latches 60 and 61 are magnets which contact ferromagnetic material in valve lever arm 56 at the final open and closed positions of valve 57. They latch the the valve and prevent it from assuming an intermediate or transition position during the intermediate periods when 56 is not being contacted by 55. Magnetic latches are described in more detail in FIGS. 9 and 10.

Figure 8:
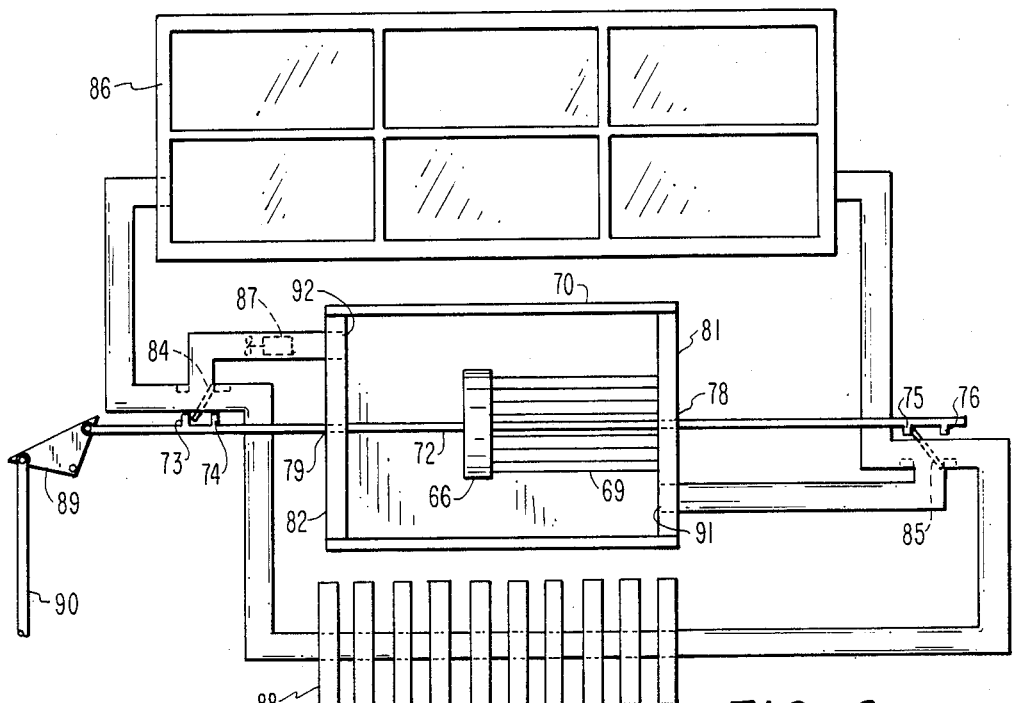
FIG. 8 shows a horizontal wire drum in a housing beneath a solar collector and a heat sink beneath the wire drum housing.

Referring now to FIG. 8, the box 70 corresponds to box 20 of FIG. 6 and functions in the same manner. The shaft 72 in this FIG. 8 functions in the same way as rod 32 of FIG. 6 in that it slides horizontally back and forth in bearings 78 and 79 located on the right and left sides of 81 and 82. However, this shaft 72 differs from 32 of FIG. 6 in that 72 is equipped with shaft cogs 73, 74,75 and 76 which activate and transition valve levers 64 and 65. The drum 66 is fixed to shaft 72 and supports temperature sessitive wire array 69. Drum 66 corresponds to and functions in the same way as drum 31 of FIG. 6. Memory metal wire array 69 corresponds to 29 of FIG. 6. The left ends of the wires of 69 are fastened to 66 and their right ends to 81 in order that alternate contractions and elongations of the wires cause 72 and 66 to slide horizontally back and forth in box 70. Valve levers 84 and 85 operate together synchronously thereby effecting either one of two possible series fluid flow communications in either one of two possible time periods. The first fluid flow communication is provided when shaft 72 is about to reach the limits of its travel to the left and this flow continues while 72 reverses direction and until just before 72 reaches the limits of its travel to the right when cog 74 contacts valve lever 84 to rotate it clockwise and when cog 76 contacts valve lever 85 rotating it counterclockwise. That first series fluid flow communication is between box 70, electric blower 87, solar collector fluid heater 86 and back to box 70. The second series fluid flow is provided as 72 is reaching the limit of its travel to the right when cog 75 con contacts 85 and when 73 contacts 84. This flow continues until 72 is beginning to reach the limit of its travel to the left and the flow is between box 70, blower 87, cooler 88 and back to box 70. The first of the two flows, which is the flow of hot air cycling through the collector 86, causes the contraction of 69 and the movement of 72 to the right whereas the second flow is of cool air and causes 72 to move to the left. Since the final fraction of movement of 72 of the left produces a flow condition to produce movement in the opposite direction, 72 will move back to the right after completing movement to the left. Similarly, the termination of rightward movement produces a condition for 72 to move to the left and 72 is thereby made to reciprocate horizontally. Bell crank 89 converts the horizontal reciprocations to vertical reciprocations of pump shaft 90 which extends to a reciprocating piston type pump not shown. The weight of 90 acts to keep wires 69 taught when they are expanding in length. Inlet and exit ports 91 and 92 respectively inlet and exit air flows to and from box 70. Blower 87 is powered by a small solar electric cell array not shown.

Figure 9:
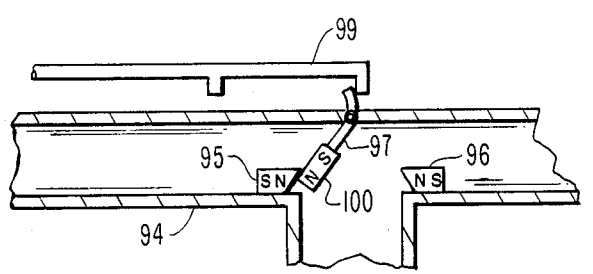
FIG. 9 shows an air valve in the form of a T and a flexible valve actuating arm.

In FIG. 9, the magnetic latching valve 94 is to be used as an alternate valve for valve 25 in FIG. 6 in an alternate embodiment. Similarly 94 may be used in place of valve 57 in FIG. 7 or for the valves in FIG. 8 in alternate embodiments. In this FIG. 9 the magnets 95 and 96 hold the valve lever 97 firmly in either of its alternate positions. Lever arm 97 is flexible in its upper portion in the manner of a spring and is capable of being placed in tension by the cog arm 99. Arm 97 then is capable of distortion by 99 until the tension is sufficient to overcome the hold of the magnets 95 and 100 or the hold of magnets 96 and 100. The energy stored in the tensioned spring of valve lever 97 allows it to swing suddenly to its alternate position thereby providing a rapid transition of valve condition once the latching hold of the magnets has been overcome. The purpose of this mechanism is to reduce the valves transition time in which both hot and cool air could be flowing together through the valve.

Figure 10:
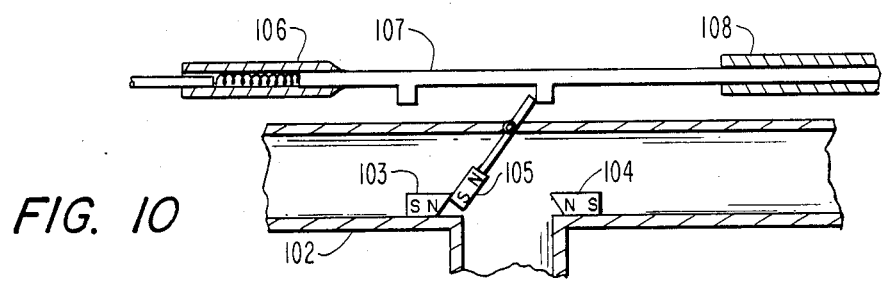
FIG. 10 shows an air valve in the form of a T with a straight valve actuating arm and a cog actuating rod with a spring attached to it.

In FIG. 10, the valve 102 has magnetic latches 103,104 and 105 which function in the same way as 95,96 and 100 of FIG. 9. Spring tension is provided by spring cylinder 106 in cog arm 107 in order to provide a rapid valve transition once the hold of the magnetic latches is overcome. Cog arm guide 108 maintains the cog arm 107 in a linear plane of travel. Cog arm guides such as 108 have been omitted in the drawings in order to provide a more simple and understandable view of the basic mechanism of each embodiment, but it is to be understood that all push rods and cog linkages throughout the drawings would have appropriate guides according to the accepted practice of the art. Valve 102 is to be used in alternate embodiments in place of valve 25 of FIG. 6 as well as in place of 57 in FIG. 7 and the valves of FIG. 8 in alternate embodiments.

Figure 11:
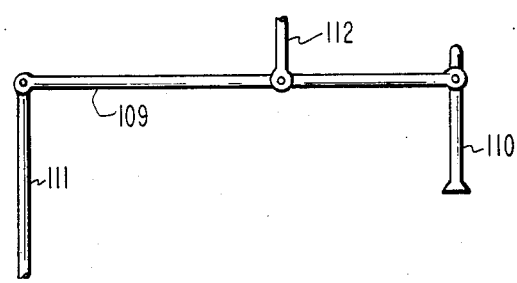
FIG. 11 shows a motion amplifier having a fulcrum with a lever and drive rods.

In FIG. 11 the amplification of shaft movement is provided by lever arm 109 which pivots on fulcrum 110 and lifts pump actuating shaft 111 when pump rod 112 lifts 109. The amplification of pumping action up and down is required for some pumps not shown which have a long throw in their reciprocating action and it is required in those embodiments in which the length of temperature sensitive wires must be limited to relatively short lengths. In one embodiment the throw of shaft 48 in FIG. 7 is increased when pump rod 112 of this FIG. 11 is the shaft 48 of FIG. 7. In other embodiments the throw of a pump rod such as pump rod 34 of FIG. 6 may be lengthened by a change in the shape of its associated bell crank such as bell crank 33 of FIG. 6. In that embodiment 33 is elongated horizontally so that the connection of 34 to 33 is extended to the left.

Throughout the drawings the relative directions of movement are based on the use of Nitinol wires for the heat sensitive wires which contract in length when heated. Wires of this alloy are available from Innovative Technology International Incorporated, 10747-3 Tucker St. Beltsville, MD. The temperatures at which these wires undergo a shape change can be adjusted to take place anywhere from −200° F. to 300° F. They are readily available in the shape transitional range of 104° F. to 194° F. This temperature range is within the range of the temperatures achieved by black box solar collectors for the temperature elevations required. Cooling temperatures can be achieved from the intake of ambient air directly and without coolers when wires are used having low temperature transition limits within an ambient temperature range as Nitinol wires do. When the low temperature limits of a given shape change alloy approximately coincide with ambient temperature then a cooler such as cooler 26 of FIG. 6 may be omitted and ambient air is to be drawn in directly during the cooling cycle. The same is true for the selective omissiom of 59 in 57. In those embodiments in which the transitional temperatures are lower and in which the cool air to be circulated over the wire during the cooling period must be lower than ambient temp., air flowing through the coolers is cooled by cooling the coolers with a flow of the cool water being pumped over the coolers.

Finally, it is not intended to limit the inventive concept to the use of air as the sole heat transfer fluid, but water and other fluids may be employed according to the closed cycle circulation patterns described in FIG. 8 with the understanding that the working elements are of the kind used for water transport. For instance in this case the collector 86 of FIG. 8 is an hydronic type solar collector and the blower 87 is understood to be a small water pump in place of an air blower.

I claim:

1. A solar heat engine comprising:
   a source of heated air provided by a hot air solar collector, a source of cool air provided by a finned air duct situated in a low temperature region,
   a thermal energy converter comprising a plurality of lengths of thermally responsive shape memory elements, each of said elements having one end attached to a drum fixed to a moveable drive rod which slides in fixed support blocks, said lengths of memory metal elements being mounted on said drum in a parallel manner in which each length has one end fixed to said drum and its opposite end fixed to the same one of the two said support blocks such that heating and cooling the parallel arranged, thermally responsive elements produces elongations and contractions of said elements and a reciprocable movement in said moveable rod attached to said drum so that said reciprocable movement may be communicated to an external load, and
   means for supplying alternate flows of air from sources of heated and cool air across said thermal energy converter comprising an air mover and switching valving repeatedly alternating series fluid flow communication firstly in one time period between said air mover, said energy converter and said source of heated air and secondly, in an alternate time period, between said air mover, said energy converter and said source of cool air such that alternate flows of heated and cooled air move through said thermal energy converter producing a reciprocating movement in said drive rod.

2. A solar heat engine as in claim 1 in which said air mover is in the form of a solar heated thermal convection column connected in fluid flow communication with one end of said thermal energy converter and in which said valving is an air flow switching valve connected to the end of the thermal energy converter opposite the end connected to said convection column, said switching valve alternating the fluid flow communication between said sources of heated and cool air and said thermal convection column such that the draft created in said thermal convection column draws air alternately from one of said sources then from the other across said thermal energy converter producing a reciprocating movement in said drive rod.

3. A solar heat engine as set forth in claims 1 or 2 in which said switching valve is operatively connected to said thermal energy converter in such a manner that the fluid flow of heated and cool air is switched near the point of maximun travel of said reciprocating movement.

4. A solar heat engine as set forth in claim 1 in which said lengths of shape memory metal elements are lengths of wire of shape memory metal.

5. A solar heat engine as set forth in claims 1 or 2 in which the switching valve is operatively connected to said thermal energy converter in such a manner that the fluid flow of heated air and then of cooled air is switched near the point of maximum travel of said reciprocating movement by two cogs on a cog arm connected by linkage to said moveable drive rod having reciprocating movement, one of said cogs contacting a valve switching lever of said valve to switch the valve near the point of maximum travel of said reciprocating movement in one direction and the other of said cogs contacting said valve switching lever to switch said valve near the point of maximum travel of said reciprocating movement in the opposite direction.

6. A solar heat engine as set forth in claims 1 and 5 in which the thermal energy converter is situated in an enclosed compartment at the base of the solar heated convection column and the moveable drive rod and the parallel lengths of thermally responsive elements are situated with their length dimension extending vertically to provide a verticle reciprocal movement, and said load attached to said drive rod is in the form of a verticle reciprocable pump actuating rod.

7. A solar heat engine as set forth in claims 1 or 2 in which the thermal energy converter is situated in an enclosed compartment adjacent to the base of the solar heated convection column and the moveable drive rod and the parallel lengths of the thermally responsive elements are situated with their length dimensions extending horizontally, and having additionally a bell crank reciprocable energy direction changer attached to said drive rod and converting horizontal reciprocating movement to verticle reciprocating movement with said load attached to said reciprocating movement being in the form of a verticle reciprocating pump actuating rod.

8. A solar heat engine as set forth in claim 1 in which said air mover is in the form of an air blower in fluid flow communication with said thermal energy converter by an opening at one end of said converter, and in which said switching valving is in the form of two air switching valves, one of said valves being in fluid flow communication with the thermal energy converter by an opening in the converter opposite the end connected to the air blower, and the other of said valves being connected to the end of the air blower opposite the end that is connected to the thermal energy converter, said switching valves being operatively connected by linkage to act synchronously to alternate the fluid flow communication between said sources of heated and cool air and said thermal energy converter such that the fluid flow generated by the air blower flows alternately from one of said sources across the energy converter and then back to that source through a connection on the opposite side of that source and then in a second time period flows from the other of said sources through the thermal energy converter and back to that source through a connection to that second source on the opposite side of that second source.

9. A solar heat engine as in claim 8 in which said switching valves are operatively connected to said thermal energy converter and to said fluid mover in such a manner that the fluid flow of heated and cooled air is switched near the point of maximum travel of said reciprocating movement.

10. A solar heat engine as in claim 8 in which said lengths of thermally responsive elements are lengths of wires of shape memory metal alloys.

11. A solar heat engine as in claim 8 in which said lengths of thermally responsive elements are lengths of metal foil of shape memory metal alloys.

12. A solar heat engine as set forth in claim 7 in which said switching valves are operatively connected to said energy converter and to said air mover in such a manner that the fluid flow of heated and cool air is switched near the point of maximum travel of said reciprocating movement by two cogs on each end of said moveable drive rod, one of said cogs on each of said drive rod contacting a valve switching lever of one of the two said switching valves synchronously to switch each of said valves near the point of maximum travel in one direction, another one of the two said cogs on each end of said drive rod contacting a valve switching lever of one of the two said switching valves synchronously to switch each of said valves near the point of maximum travel in the opposite direction.

* * * * *